United States Patent
Chen et al.

(10) Patent No.: US 7,376,847 B2
(45) Date of Patent: May 20, 2008

(54) POWER DISTRIBUTION CONTROL CIRCUIT FOR MULTI-POWER DOMAIN ELECTRONIC CIRCUITS

(75) Inventors: Sho-Mo Chen, Cupertino, CA (US); Fei Ye, Cupertino, CA (US)

(73) Assignee: ForteMedia, Inc., Cupertino, CA (US)

( * ) Notice: Subject to any disclaimer, the term of this patent is extended or adjusted under 35 U.S.C. 154(b) by 360 days.

(21) Appl. No.: 11/159,992

(22) Filed: Jun. 22, 2005

(65) Prior Publication Data

US 2006/0294399 A1    Dec. 28, 2006

(51) Int. Cl.
*G06F 1/00* (2006.01)
*G06F 1/26* (2006.01)
*G06F 11/30* (2006.01)

(52) U.S. Cl. .................. 713/300; 713/320; 713/324; 713/330; 713/340

(58) Field of Classification Search .................. 713/300
See application file for complete search history.

(56) References Cited

U.S. PATENT DOCUMENTS

| | | | | |
|---|---|---|---|---|
| 5,739,596 A | * | 4/1998 | Takizawa et al. | 307/66 |
| 5,973,552 A | * | 10/1999 | Allan | 327/544 |
| 6,735,706 B2 | * | 5/2004 | Tomlinson et al. | 713/300 |

* cited by examiner

*Primary Examiner*—Rehana Perveen
*Assistant Examiner*—Stefan Stoynov
(74) *Attorney, Agent, or Firm*—Perkins Coie LLP

(57) ABSTRACT

Methods and apparatus are disclosed for controlling power distribution during transitory power-up period of multi-domain electronic circuits that are supplied by multiple power supplies. The power distribution is controlled by self-regulating power control circuits that operate based on power-up sequencing requirements. Described embodiments of the invention illustrate examples of power-switch and power-switch controller circuits used as elements of the power control circuitry.

13 Claims, 5 Drawing Sheets

POWER DISTRIBUTION CONTROL CIRCUIT FOR MULTI-POWER DOMAIN ELECTRONIC CIRCUITS

TECHNICAL FIELD

The embodiments described below relate generally to electronic circuits, and more particularly, to power distribution in a multi-power-source, multi-domain, integrated circuit.

BACKGROUND

Logic control signals generated by the power-up reset signals of various power supplies are commonly used to determine the power-up sequence logic in an integrated circuit device. However, during power-up of an integrated circuit device that has multi-power domains, there is no sequencing control by the integrated circuit device over the external power supplies, and the traditional methods cannot control the sequencing of power supplies within functional blocks where specific power-up sequences are required.

The transitional instability of the power level of different power supplies during the power-up process is an important issue during the power-up process. Conventional level shifters can be used to transfer logic signals among various power levels when power supplies are stable; however, during power-up mode, not all power supplies are stable. In most cases, during power-up process, some power supplies become stable while others either continue to ramp up or remain inactivated. Specially designed level shifting circuits are needed to handle the power-up processes.

DETAILED DESCRIPTION

Various embodiments of the invention will now be described. The following description provides specific details for a thorough understanding and enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

The described embodiments illustrate the use of self-controlled power switches to control the power supplied by different power supplies to various functional blocks of an integrated circuit device. The required power-up sequence within a functional block is controlled by a set of power switches. When the power levels (voltages) of different power supplies are not the same, it is often required for a signal from a lower power supply level to control the power switches that control the higher power levels.

Another issue concerning the power-up process is the potential instability of the power being supplied during the power-up transition period of a power supply. When power supplies are stable, conventional level shifters may be used to transfer logic signals among various power levels; however, during power-up mode, not all power supplies are stable. In fact in most cases some power supplies become stable while others either continue to ramp up or remain inactivated. Therefore, especially designed level shifting circuits are needed to handle the power-up processes.

In circumstances where a power-up sequence is required, since not all power supplies may be stable or activated, the power switches must be controlled by the power-up sequence, rather than by a fixed logic that is only suitable for stable power levels. In these cases the controls to the power switches are designed to be self-timed and self-adjusted to satisfy the required power-up sequences.

Figure 1:
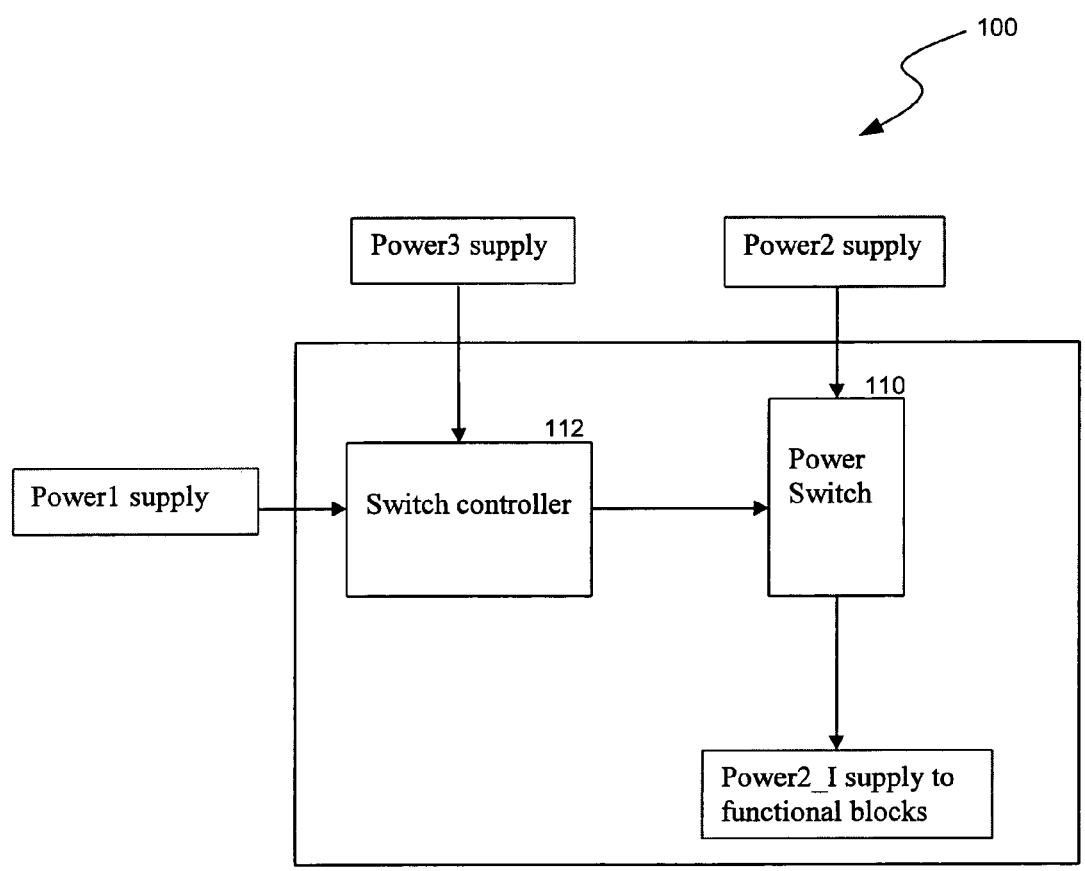
FIG. 1 illustrates an example of a power-up sequence control circuit, in accordance with an embodiment of the invention.

FIG. 1 illustrates an example of a power-up sequence control circuit 100, in accordance with an embodiment of the invention. In this example, there are three power supplies for the integrated circuit device, and the power levels of these power supplies are different. Power1, Power2, and Power3 represent these three power supplies.

Power3 has the highest power level (voltage), Power2 has a power level lower than Power3 but higher than Power1, and Power1 has the lowest power level. During the power-up stage, Power3 is the first to be stable, while Power2 and Power1 will be ramping up to stable levels. It is also required that Power2 goes to the corresponding functional blocks after Power1 is stable, regardless of the order in which they become stable. By controlling the power switch 110 located between Power2 and the functional blocks supplied by Power2, the switch controller 112 regulates the required sequencing of Power1 and Power2.

Figure 2:
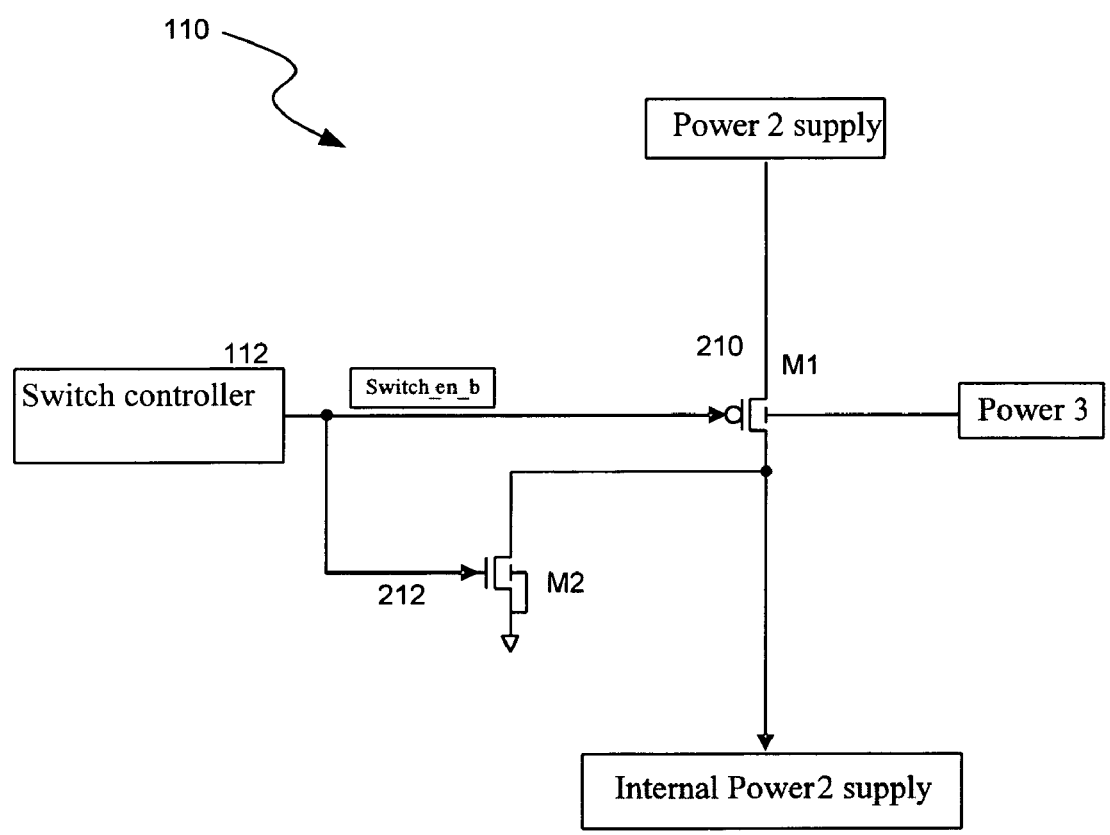
FIG. 2 illustrates a power-switch, which is an element of the power-up sequence control circuit of FIG. 1, in accordance with an embodiment of the invention.

FIG. 2 is a schematic diagram of the power switch 110, which consists of a PMOS transistor 210 whose body is connected to Power2, and whose gate is controlled by the switch controller 112. There is also an NMOS transistor 212 serving as a leakage device when the power switch is not turned on. This leakage device discharges the Internal Power2 Supply when the switch M1 is turned off, so that the Internal Power2 Supply is not in a floating state.

Figure 3:
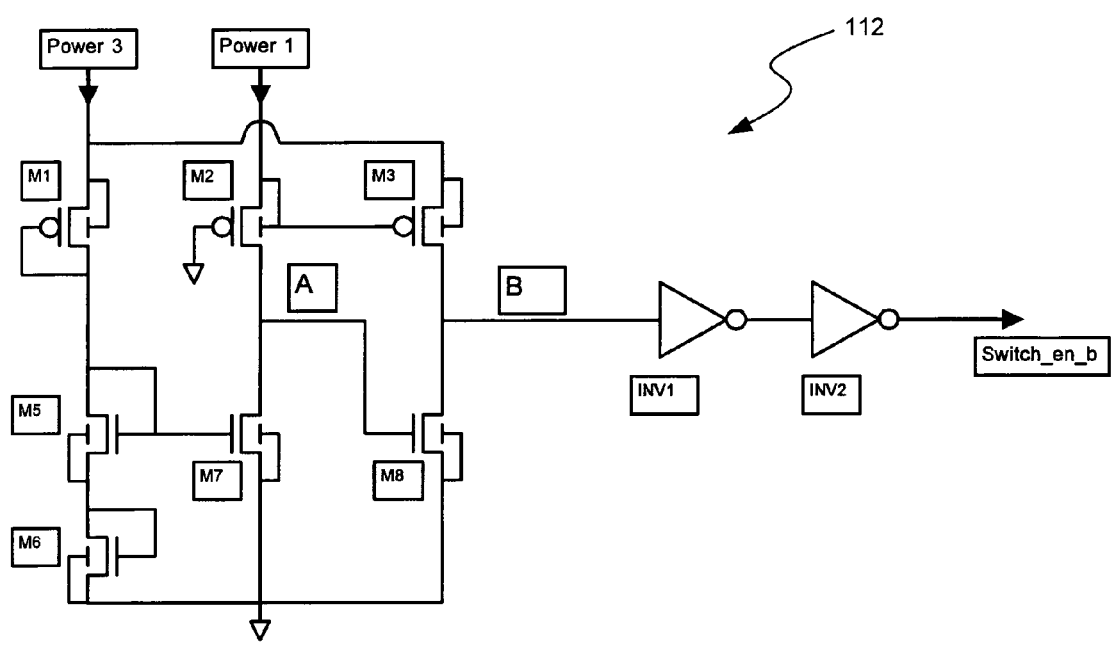
FIG. 3 illustrates a power-switch controller, which is an element of the power-up sequence control circuit of FIG. 1, in accordance with another embodiment of the invention.

FIG. 3 is a schematic diagram of the power switch controller 112. The power switch controller 112 has three parts:

1-Power1 detection circuit (M2, M7, M1, M5, M6)
2-Power1 detection trigger circuit (M3, M8)
3-Power1 signal to Power3 signal level shifting circuit (M3, M8, INV1, INV2)

Transistors M1, M5, M6 generate a bias voltage for M7 to limit its current. The gate of transistor M2 is tied to ground (GND) so that it becomes conducting as soon as Power1 is above $V_t$ (the device threshold turn-on voltage). M3 is a weak PMOS device and M8 is turned on only if Power1 is high enough to offset the biased current sink by M7.

When Power3 is on and Power1 is off, the output of the circuit (Switch_en_b) is high (Power3 level) because M3 is on and M8 is fully off.

When Power1 starts to ramp up, M2 starts conducting. When the voltage level at point A reaches $V_t$ of M8, M8 starts conducting, and the Voltage level at point B starts to drop. In this situation the output Switch_en_b changes from high to low.

Figure 4:
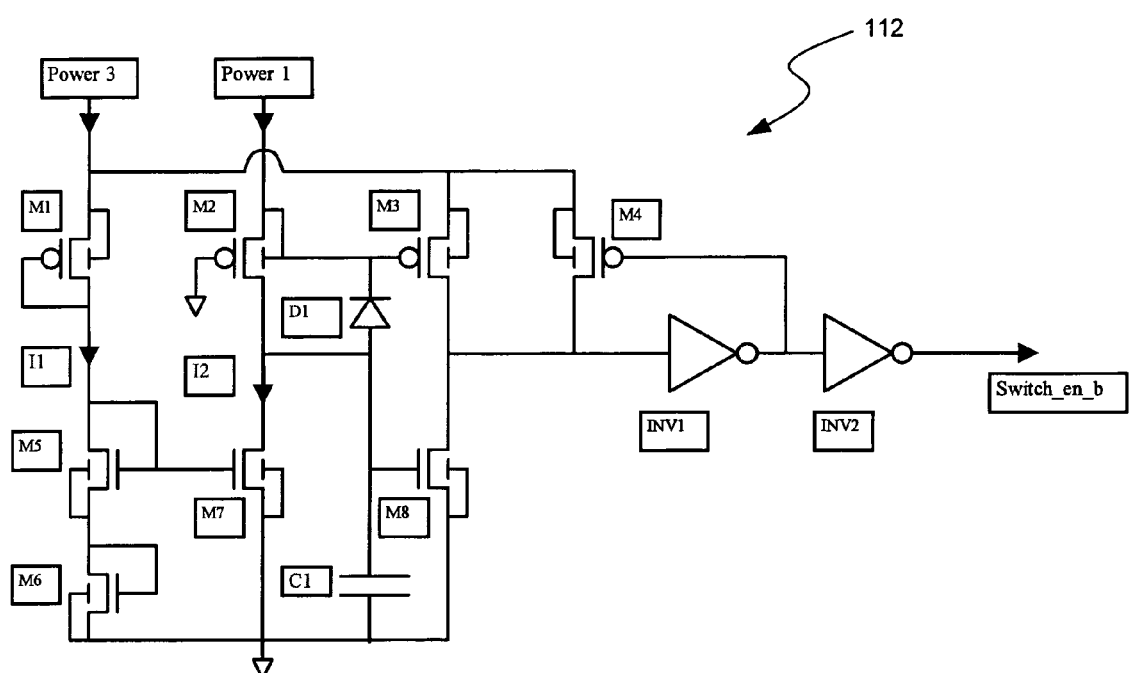
FIG. 4 illustrates a power-switch controller, in accordance with yet another embodiment of the invention.

FIG. 4 is a schematic diagram of another power switch controller 112, where:

- M4 is the feedback for the switch on lock-up (because M3 is a weak pull-up device, it is sensitive to noise. M4 reduces the noise sensitivity by providing a latch-like structure, especially when the Power1 is not ready.);
- D1 is the diode for preset state (D1 provides a discharge path for the gate of M8 to turn off M8 when Power1 is off so that the control circuit can return back to the preset state.); and
- C1 is to reduce noise (in an integrated device, there are noise generated by other circuits. C1 reduces the M8 gate sensitivity to such noise.).

Figure 5:
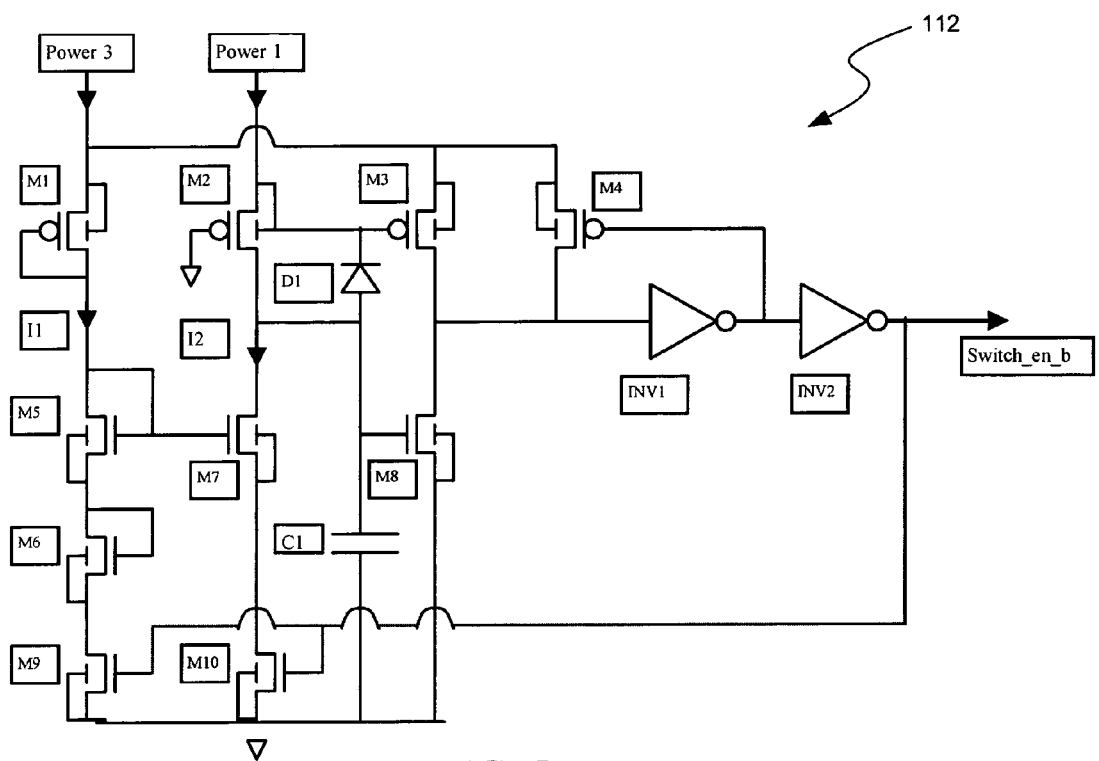
FIG. 5 illustrates a power-switch controller, in accordance with yet another embodiment of the invention.

FIG. 5 is a schematic diagram of an alternative power switch controller 112, where M9 and M10 are feedbacks for turning off bias and detection circuit static currents. M9 and M10 are for power management. When Power1 is off, M9 and M10 are turned on so that the control circuit is ready to operate. After Power is up and stable, M9 and M10 are turned off so that the DC current I1 and I2 are eliminated, thus reducing the power consumption of the control circuit.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof.

Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize.

The teachings of the invention provided herein can be applied to other systems, not necessarily the system described above. The elements and acts of the various embodiments described above can be combined to provide further embodiments.

Changes can be made to the invention in light of the above Detailed Description. While the above description describes certain embodiments of the invention, and describes the best mode contemplated, no matter how detailed the above appears in text, the invention can be practiced in many ways. Details of the compensation system described above may vary considerably in its implementation details, while still being encompassed by the invention disclosed herein.

As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. Accordingly, the inventors reserve the right to add additional claims after filing the application to pursue such additional claim forms for other aspects of the invention

We claim:

1. In an integrated circuit, wherein power is supplied by different power supplies to different parts of the circuit, a control apparatus for providing each circuit part with a predetermined sequence during a power-up transition period, wherein at least one predetermined power-up sequence is related to stability of the power supplies during the power-up transition period, the apparatus comprising:

at least one power switch, connecting each power supply to a corresponding circuit part;

at least one power switch controller, regulating the at least one power switch; and a configuration wherein:

inputs to the at least one power switch controller comprise a set of power outputs from all the power supplies that are considered in the power-up sequence of the corresponding circuit part;

a regulating output of the at least one power switch controller is a function of the power outputs from all the power supplies that are considered in the power-up sequence of the corresponding circuit part;

stability of input power levels is monitored by the at least one power switch controller to generate a regulating output that controls the at least one power switch or a self power down control circuitry which eliminates operational power after the power switch has reached a final regulating state, or both; and each power supply individually supplies power to the corresponding circuit part after the power-up transition period.

2. The apparatus of claim 1, further comprising a self power down control circuitry means for eliminating an operational power after the power switch reaches a final regulating state.

3. The apparatus of claim 1, wherein the power switch controller is self-timed and self-adjusted to satisfy corresponding power-up sequence requirements.

4. The apparatus of claim 1, wherein the power switch includes a transmission gate or a PMOS transistor, and wherein the transmission gate or the PMOS is controlled by the power switch controller regulating output which also controls a pre-bias device so that when the transmission gate or the PMOS is not turned on, the power switch output is set to a defined voltage value.

5. The apparatus of claim 4, wherein the power switch controller regulating output is connected to the PMOS transistor gate and to an NMOS transistor gate, where the NMOS transistor serves as a leakage device when the PMOS transistor is not turned on and the power switch output is set to ground.

6. The apparatus of claim 1, wherein the power switch controller utilizes at least one transistor threshold to generate regulating signals at predetermined power voltages during a ramp-up of power supplies in a power-up period to satisfy power-up sequence requirements.

7. In an integrated circuit being fed by more than one power supplies, a method for providing power in a required sequence to different parts of the circuit during a transitory power-up period, the method comprising:
controlling the supply of power from each power supply to each corresponding circuit part, by using at least one control signal, wherein each power supply individually supplies power to each corresponding circuit part after the transitory power-up period;
generating each control signal corresponding to the control of the supply of power to each circuit part, by using the power outputs of the power supplies involved in a corresponding required sequence;
monitoring stability of each power supply output by checking an output voltage; and
generating each control signal when the output voltages of the involved power supplies reach or exceed predetermined threshold voltages.

8. The method of claim 7, wherein the control signal is self-timed and self-adjusted to satisfy corresponding power-up sequence requirements.

9. The method of claim 7, wherein the control of the power to the circuit parts is implemented by a PMOS transistor, and wherein the PMOS transistor gate is controlled by the control signal.

10. The method of claim 7, wherein monitoring the stability of each power supply output is accomplished by utilizing transistor thresholds during a ramp-up of the power supplies.

11. In a circuit with more than one external power supplies, a means for providing power in a prescribed sequence to different parts of the circuit during a transitory power-up period, the means comprising:
a means for controlling the supply of power from each power supply to each corresponding circuit part, using at least one control signal, wherein each power supply individually supplies power to each corresponding circuit part after the transitory power-up period;
a means for generating each control signal corresponding to the control of the supply of power to each circuit part, using the power outputs of the power supplies involved in the sequence;
a means for monitoring stability of each power supply output; and
a means for generating each control signal when the output voltages of the involved power supplies reach or exceed predetermined thresholds.

12. In an integrated circuit, wherein power is supplied by different power supplies to different parts of the circuit, a control apparatus for providing each circuit part with a predetermined sequence during a power-up transition period, wherein at least one predetermined power-up sequence is related to stability of the power supplies during the power-up period, the apparatus comprising:
at least one power switch, connecting each power supply to a corresponding circuit part, wherein the power switch includes a transmission gate or a PMOS transistor, and wherein the transmission gate or the PMOS is controlled by the power switch controller regulating output which also controls a pre-bias device so that when the transmission gate or the PMOS is not turned on, the power switch output is set to a defined voltage value;
at least one power switch controller, regulating the at least one power switch; and
a configuration wherein:
inputs to the at least one power switch controller comprise a set of power outputs from all the power supplies that are considered in the power-up sequence of the corresponding circuit part;
a regulating output of the at least one power switch controller is a function of the power outputs from all the power supplies that are considered in the power-up sequence of the corresponding circuit part; and
stability of input power levels is monitored by the at least one power switch controller to generate a regulating output that controls the at least one power switch or a self power down control circuitry which eliminates operational power after the power switch has reached a final regulating state, or both.

13. In an integrated circuit, wherein power is supplied by different power supplies to different parts of the circuit, a control apparatus for providing each circuit part with a predetermined sequence during a power-up transition period, wherein at least one predetermined power-up sequence is related to stability of the power supplies during the power-up period, the apparatus comprising:
at least one power switch, connecting each power supply to a corresponding circuit part, wherein the power switch includes a transmission gate or a PMOS transistor, and wherein the transmission gate or the PMOS is controlled by the power switch controller regulating output which also controls a pre-bias device so that when the transmission gate or the PMOS is not turned on, the power switch output is set to a defined voltage value;
at least one power switch controller, regulating the at least one power switch, wherein the power switch controller regulating output is connected to the PMOS transistor gate and to an NMOS transistor gate, where the NMOS transistor serves as a leakage device when the PMOS transistor is not turned on and the power switch output is set to ground; and
a configuration wherein:
inputs to the at least one power switch controller comprise a set of power outputs from all the power supplies that are considered in the power-up sequence of the corresponding circuit part;
a regulating output of the at least one power switch controller is a function of the power outputs from all the power supplies that are considered in the power-up sequence of the corresponding circuit part; and
stability of input power levels is monitored by the at least one power switch controller to generate a regulating output that controls the at least one power switch or a self power down control circuitry which eliminates operational power after the power switch has reached a final regulating state, or both.

* * * * *